US012005522B2

(12) United States Patent
Martinez et al.

(10) Patent No.: US 12,005,522 B2
(45) Date of Patent: Jun. 11, 2024

(54) CONTINUOUS LASER NANOFORMING DEVICE

(71) Applicant: Purdue Research Foundation, West Lafayette, IN (US)

(72) Inventors: Ramses Valentin Martinez, West Lafayette, IN (US); Debkalpa Goswami, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 368 days.

(21) Appl. No.: 16/810,084

(22) Filed: Mar. 5, 2020

(65) Prior Publication Data

US 2020/0298342 A1 Sep. 24, 2020

Related U.S. Application Data (60) Provisional application No. 62/819,706, filed on Mar. 18, 2019.

(51) Int. Cl.
*B23K 26/356* (2014.01)
*B23K 26/08* (2014.01)
*B23K 103/00* (2006.01)
*B23K 103/14* (2006.01)
*C21D 10/00* (2006.01)

(52) U.S. Cl.
CPC ............ *B23K 26/356* (2015.10); *B23K 26/08* (2013.01); *C21D 10/005* (2013.01); *B23K 2103/14* (2018.08); *B23K 2103/42* (2018.08); *B23K 2103/52* (2018.08); *B23K 2103/54* (2018.08)

(58) Field of Classification Search
CPC .. B23K 26/356; B23K 26/08; B23K 26/0846; B23K 2101/18; B23K 2103/14; B23K 2103/42; B23K 2103/52; B23K 2103/54; C21D 10/005; C21D 10/00; C21D 2251/04; C21D 9/50; B21D 26/06; B21D 17/04; B21D 43/09; B22F 1/0547; B22F 2007/042; B22F 2999/00; B22F 3/08; B22F 3/087; B22F 3/105; B22F 7/04; B82Y 20/00; B82Y 30/00; H01L 31/022491; H01L 31/1884
USPC .................................................. 219/58, 121
See application file for complete search history.

(56) References Cited

U.S. PATENT DOCUMENTS

| | | | |
|---|---|---|---|
| 7,217,344 B2 | 5/2007 | Sasaki et al. | |
| 8,027,086 B2 * | 9/2011 | Guo | G02B 5/3058 359/485.05 |
| 8,499,599 B2 * | 8/2013 | Cheng | B21D 26/06 29/421.2 |
| 10,596,661 B2 * | 3/2020 | Kalentics | B33Y 10/00 |
| 10,700,165 B2 * | 6/2020 | Bauswell | H01L 29/66977 |

(Continued)

OTHER PUBLICATIONS

Dumond et al., Recent developments and design challenges in continuous roller micro- and nanoimprinting, J. Vac. Sci. Technol. B30, 010801, 2012 (Year: 2012).*

(Continued)

*Primary Examiner* — Vy T Nguyen
(74) *Attorney, Agent, or Firm* — Purdue Research Foundation (57) ABSTRACT

The present disclosure relates to a novel continuous laser nanoforming device, and the methods to make and use the continuous laser nanoforming device.

20 Claims, 8 Drawing Sheets (56) References Cited

U.S. PATENT DOCUMENTS

2016/0250712 A1* 9/2016 Cheng .................. C21D 10/005
219/58

OTHER PUBLICATIONS

David J. Elliott, in Ultraviolet Laser Technology and Applications, 1995, Chapter 3 (Year: 1995).*
Kugler, Main Types of Lasers Used for Manufacturing—Key Properties and Key Applications, LME2011 (Year: 2011).*
Zhang et al., Effect of nano-sized titanium powder addition on corrosion performance of epoxy coatings, 2007 (Year: 2007).*
Linear actuator guide, Anaheim automation (Year: 2018).*
Goswami D. et al., Roll-to-Roll Nanoforming of Metals Using Laser-Induced Superplasticity. Nano Lett. 2018, 18, 6, 3616-3622.
Ahn, S. H. et al., Large-Area Roll-to-Roll and Roll-to-Plate Nanoimprint Lithography: A Step toward High-Throughput Application of Continuous Nanoimprinting, ACS Nano, 3 (8), pp. 2304-2310, 2009.
Bozhevolnyi, S. I. et al., Channel Plasmon-Polariton Guiding by Subwavelength Metal Grooves, Physical Review Letters, 95, p. 046802, 4 pp, 2005.
Gao, H. et al., Laser-Induced High-Strain-Rate Superplastic 3-D Microforming of Metallic Thin Films, Journal of Microelectromechanical Systems, 19 (2), pp. 273-28I, 2010.
Gao, H. et al., Large-scale nanoshaping of ultrasmooth 3D crystalline metallic structures, Science, 346 (6215), pp. 1352-1356, 2014.
Hu, Y. et al., Superplastic Formation of Metal Nanostructure Arrays with Ultrafine Gaps, Adv. Mater., 28, pp. 9152-9162, 2016.
Hu, Y. et al., Ultrafast direct fabrication of flexible substrate-supported designer plasmonic nanoarrays, Nanoscale, 8, pp. 172-182, 2016.
Kruk, S. S. et al., Magnetic hyperbolic optical metamaterials, Nat. Commun., 7, p. 11329, 7 pp, 2016.
Leitgeb, M. et al., Multilength Scale Patterning of Functional Layers by Roll-to-Roll Ultraviolet-Light-Assisted Nanoimprint Lithography, ACS Nano, 10, pp. 4926-4941, 2016.
Li, Y. et al., Material versatility using replica molding for large-scale fabrication of high aspect-ratio, high density arrays of nano-pillars, Nanotechnology, 25, p. 285303, 10 pp, 2014.
Zhang, Y. et al., Replica Molding of High-Aspect-Ratio Polymeric Nanopillar Arrays with High Fidelity, Langmuir, 22, pp. 8595-8601, 2006.

* cited by examiner

CONTINUOUS LASER NANOFORMING DEVICE

CROSS-REFERENCE TO RELATED APPLICATION

This application claims the benefits of United States Provisional Application Ser. No. 62/819,706, filed Mar. 18, 2019. The contents of which are incorporated herein entirely.

STATEMENT REGARDING PRIOR DISCLOSURES BY THE INVENTORS OR JOINT INVENTORS UNDER 37 C.F.R. 1.77(b)(6)

Ramses Valentin Martinez and Debkalpa Goswami, the inventors or joint inventors of the present disclosure, publicly disclosed information related to the present disclosure in article GOSWAMI D. et al., Roll-to-Roll Nanoforming of Metals Using Laser-Induced Superplasticity. Nano Lett. 2018, 18, 6, 3616-3622. The article was first published on May 18, 2018, which is less than one year from the filing date of the U.S. Provisional Application Ser. No. 62/819, 706, filed Mar. 18, 2019. The other four listed co-authors Juan C. Munera, Aniket Pal, Behnam Sadri, and Caio Lui P. G. Scarpetti of the article are not inventors for the present disclosure because the five listed co-authors only provided supervised contributions instead of providing inventive contribution. A copy of a print out of the article is provided on a concurrently filed Information Disclosure Statement (IDS).

TECHNICAL FIELD

The present disclosure relates to a novel continuous laser nanoforming device, and the methods to make and use the continuous laser nanoforming device.

BACKGROUND

This section introduces aspects that may help facilitate a better understanding of the disclosure. Accordingly, these statements are to be read in this light and are not to be understood as admissions about what is or is not prior art.

Exploiting the potential applications of metallic nanostructures in a variety of fields such as plasmonics, electronics, and biosciences requires large-scale manufacture of such structures with high quality and nanoscale resolution. Although many nanopatterning processes enable the cost-effective fabrication of metallic nanostructures over large areas, the required post-patterning steps (such as metallization and lift-off) increase the cost, complexity, and processing time of these techniques, reducing their throughput. Additionally, post-patterning processes generally affect the crystallinity, sharp corners, and homogeneity of the lateral walls of the final nanostructures.

The development of a high-throughput manufacturing method capable of producing ultrasmooth crystalline metallic nanostructures at ambient conditions using a roll-to-roll approach still remains a challenge.

SUMMARY

The present invention provides a novel continuous laser nanoforming device, and methods to make and use the continuous laser nanoforming device.

In one embodiment, the present disclosure provides a continuous laser nanoforming device comprising:
an underlying nanomold capable of continuously receiving and transporting a metallic film, wherein the metallic film comprises a metal layer and an ablative layer;
a laser generator capable of generating a laser beam to hit the ablative layer of the metallic film to generate a shockwave; and
a movable optical window capable of confining said shockwave during the continuous motion of the metallic film.

In another embodiment, the present disclosure provides a method of roll-to-roll nanoforming of a metallic coating to a flexible substrate, wherein the method comprises:
providing a roll-to-roll nanoforming device, wherein the roll-to-roll nanoforming device comprises an underlying metal-coated nanomold, a laser generator, an optical window, and a film delivering device configured to perform roll-to-roll nanoforming;
providing a metallic film comprising a metal layer and an ablative layer;
providing a flexible substrate delivered by the film delivering device;
allowing underlying metal-coated nanomold to move and continuously passing the metallic film to the nanomold such that the metal layer faces the nanomold, and the ablative layer faces the optical window;
providing a laser beam to allow the laser beam to pass the optical window and hit the ablative layer to cause the ablative layer to vaporize and then induces the metal layer into the nanomold while the nanomold is moving; and
bringing the portion of nanomold with induced metal layer into contact with the flexible substrate and allowing the metal layer to coat onto the flexible substrate.

BRIEF DESCRIPTION OF THE DRAWINGS

FIG. 1 shows R2RLIS set up and capabilities. (a) Schematic diagram of the pilot line for the roll-to-roll nanoforming of metals. 1) During the nanoforming of the metal film, an IR window (ZnSe) is used as a confinement layer, so that the expansion of the ablated graphite layer induces the superplastic deformation of the metal film into the nanomold upon laser irradiation. 2) After the nanopatterned metal is brought to contact with the supporting plastic film, a second laser scan welds the metal to the plastic substrate. (b) 5×7 array of 1 $cm^2$ nanoformed Au domains welded to a flexible PET substrate. (c) Nanopatterned Au/PET composite with enough flexibility and interfacial adhesion to withstand bending and being tied into a knot. Inset shows a high-resolution AFM image of the ultrasmooth Au nanogratings (350 nm linewidth). All scale bars are 2 cm.

FIG. 7 shows strain hardening and grain refinement of the nanostructures fabricated by R2RLIS. (a) Force (F)-indentation depth (h) curves obtained by the AFM nanoindentation of Al and Au films showing the strain hardening due to R2RLIS. Deviation from the Hertz model indicates plastic deformation of the metals. Higher forces are required to attain equivalent indentation depths after R2RLIS. (b) Increase in hardness achieved by R2RLIS for Al (27.6% increase), Au (30% increase), Ag (41.4% increase), and Cu (25.8% increase). Error bars indicate standard deviation from 21 nanoindentations on each sample. (c) 10 μm×10 μm AFM topography images of Au surface before and after their nanoforming against a flat mold by R2RLIS. The histograms show that R2RLIS reduces the average surface roughness ($R_a$) from 41.8 nm to 1.2 nm. (d, e) 2 μm×2 μm AFM topography images showing the grain structure of the Au surface before and after R2RLIS. Insets show high-resolution scans of the indicated regions. The average grain size is reduced from 117±23 nm to 31±4 nm by R2RLIS. Scale bars in the insets are 100 nm.

FIG. 8 shows controlling the aspect ratio and the optical properties of the fabricated nanostructures by tuning the laser power applied during R2RLIS. (a) AFM cross-section of the Au nanogratings patterned on an Au film by applying different laser power densities. All nanogratings were formed using the same Ti/epoxy nanomold (222 nm height and 350 nm linewidth). (b) Dependence on the power density of the height and hardness of the fabricated nanostructures. (c) Comparison of the experimental reflectance at normal incidence of an Au grating produced by R2RLIS with the FDTD simulation of the same grating with an idealized geometry (140 nm height and 350 nm linewidth). (d) Simulated normalized electric field distribution of the Au grating measured in panel (c) under TM polarized incident light at the wavelength of 450 nm. (e) Map of the reflectance of the gold nanogratings versus wavelength and height of the nanostructures. The linewidth is fixed to 350 nm. White circles indicate the minimum reflection values obtained from experimental reflectance measurements. (f) Experimental reflection spectra of seven representative Au nanogratings with specific heights. The locus of the minimum reflectance of the experimental measurements are in good agreement with FDTD simulations.

DETAILED DESCRIPTION

For the purposes of promoting an understanding of the principles of the present disclosure, reference will now be made to embodiments illustrated in drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

This disclosure provides a low-cost, scalable nanomanufacturing process that enables the continuous forming of thin metallic layers with nanoscale accuracy using roll-to-roll, laser-induced superplasticity (R2RLIS). R2RLIS uses a laser shock to induce the ultrahigh-strain-rate deformation of metallic films at room temperature into low-cost polymeric nanomolds, independently of the original grain size of the metal. This simple and inexpensive nanoforming method does not require access to cleanrooms and associated facilities, and can be easily implemented on conventional $CO_2$ lasers, enabling laser systems commonly used for rapid prototyping or industrial cutting and engraving to fabricate uniform and three-dimensional crystalline metallic nanostructures over large areas. Tuning the laser power during the R2RLIS process enables the control of the aspect ratio and the mechanical and optical properties of the fabricated nanostructures. This roll-to-roll technique successfully fabricates mechanically strengthened gold plasmonic nanostructures with aspect ratios as high as 5 that exhibit high oxidation resistance and strong optical field enhancements. The $CO_2$ laser used in R2RLIS can also integrate the fabricated nanostructures on transparent flexible substrates with robust interfacial contact. The ability to fabricate ultrasmooth metallic nanostructures using roll-to-roll manufacturing enables the large-scale production, at a relatively low-cost, of flexible plasmonic devices towards emerging applications.

In one embodiment, the present disclosure provides a continuous laser nanoforming device comprising:
- an underlying nanomold capable of continuously receiving and transporting a metallic film, wherein the metallic film comprises a metal layer and an ablative layer;
- a laser generator capable of generating a laser beam to hit the ablative layer of the metallic film to generate a shockwave; and
- a movable optical window capable of confining said shockwave during the continuous motion of the metallic film.

In one embodiment of the present disclosure regarding the continuous laser nanoforming device, wherein the laser generator is a continuous laser, a pulsed laser, or a fiber laser operating in the visible or infrared spectrum. In one aspect, the laser generator is a carbon dioxide ($CO_2$) laser generator.

In one embodiment of the present disclosure regarding the continuous laser nanoforming device, wherein the optical window comprises materials that may be but is not limited to silicate glass, soda-lime glass, $CaF_2$, ZnSe, or any other solid or liquid media transparent at the wavelength of emission of the laser used. In one preferred aspect, the optical window is $CaF_2$ or ZnSe optical window.

In one embodiment of the present disclosure regarding the continuous laser nanoforming device, wherein the device further comprises a film feeding device configured to provide the metallic film substrate during the performing of the roll-to-roll nanoforming.

In one embodiment of the present disclosure regarding the continuous laser nanoforming device, wherein the device further comprises a roll-to-roll system to transfer the nanoformed metal to a new substrate. The new substrate may be but is not limited to any flexible plastic, metal, or paper-based substrate. The substrate may be a rigid, flexible, or stretchable substrate.

In one embodiment of the present disclosure regarding the continuous laser nanoforming device, wherein the device further comprises a roll-to-roll system to adhere the nanoformed metal to a rigid, flexible, or stretchable substrate.

In one embodiment of the present disclosure regarding the continuous laser nanoforming device, wherein the underlying nanomold is a thin nanopatterned metal, polymer, ceramic, glass, or any combination thereof.

In one embodiment of the present disclosure regarding the continuous laser nanoforming device, wherein the underlying nanomold is a metal-coated polymeric nanomold. In one aspect, the underlying metal-coated nanomold is a titanium-coated epoxy-based nanomold.

In one embodiment of the present disclosure regarding the continuous laser nanoforming device, wherein the nanomold may be coated with one or multiple layers of a reinforcing material.

In one embodiment of the present disclosure regarding the continuous laser nanoforming device, wherein the underlying nanomold comprises one or more rollers to allow the underlying nanomold to maintain continuous contact with the material to nanopattern.

In one embodiment of the present disclosure regarding the continuous laser nanoforming device, wherein the film-feeding device comprises one or a plurality of rollers.

In one embodiment of the present disclosure regarding the continuous laser nanoforming device, wherein the ablative layer comprises graphite. In one aspect, the graphite comprises graphite flakes.

In another embodiment, the present disclosure provides a method of roll-to-roll nanoforming of a metallic coating to a flexible substrate, wherein the method comprises:
- providing a roll-to-roll nanoforming device, wherein the roll-to-roll nanoforming device comprises an underlying metal-coated nanomold, a laser generator, an optical window, and a film delivering device configured to perform roll-to-roll nanoforming;
- providing a metallic film comprising a metal layer and an ablative layer;
- providing a flexible substrate delivered by the film delivering device;
- allowing underlying metal-coated nanomold to move and continuously passing the metallic film to the nanomold such that the metal layer faces the nanomold, and the ablative layer faces the optical window;
- providing a laser beam to allow the laser beam to pass the optical window and hit the ablative layer to cause the ablative layer to vaporize and then induces the metal layer into the nanomold while the nanomold is moving; and
- bringing the portion of nanomold with induced metal layer into contact with the flexible substrate and allowing the metal layer to coat onto the flexible substrate.

In one embodiment of the present disclosure regarding the method of roll-to-roll nanoforming of a metallic coating to a flexible substrate, wherein the method comprises applying a second laser scan to the portions of the nanoform metal layer to trim it, cut it, or adhere it to the surface of the carrying substrate.

Pilot Line for Roll-to-Roll Nanoforming of Metals

Figure 1:
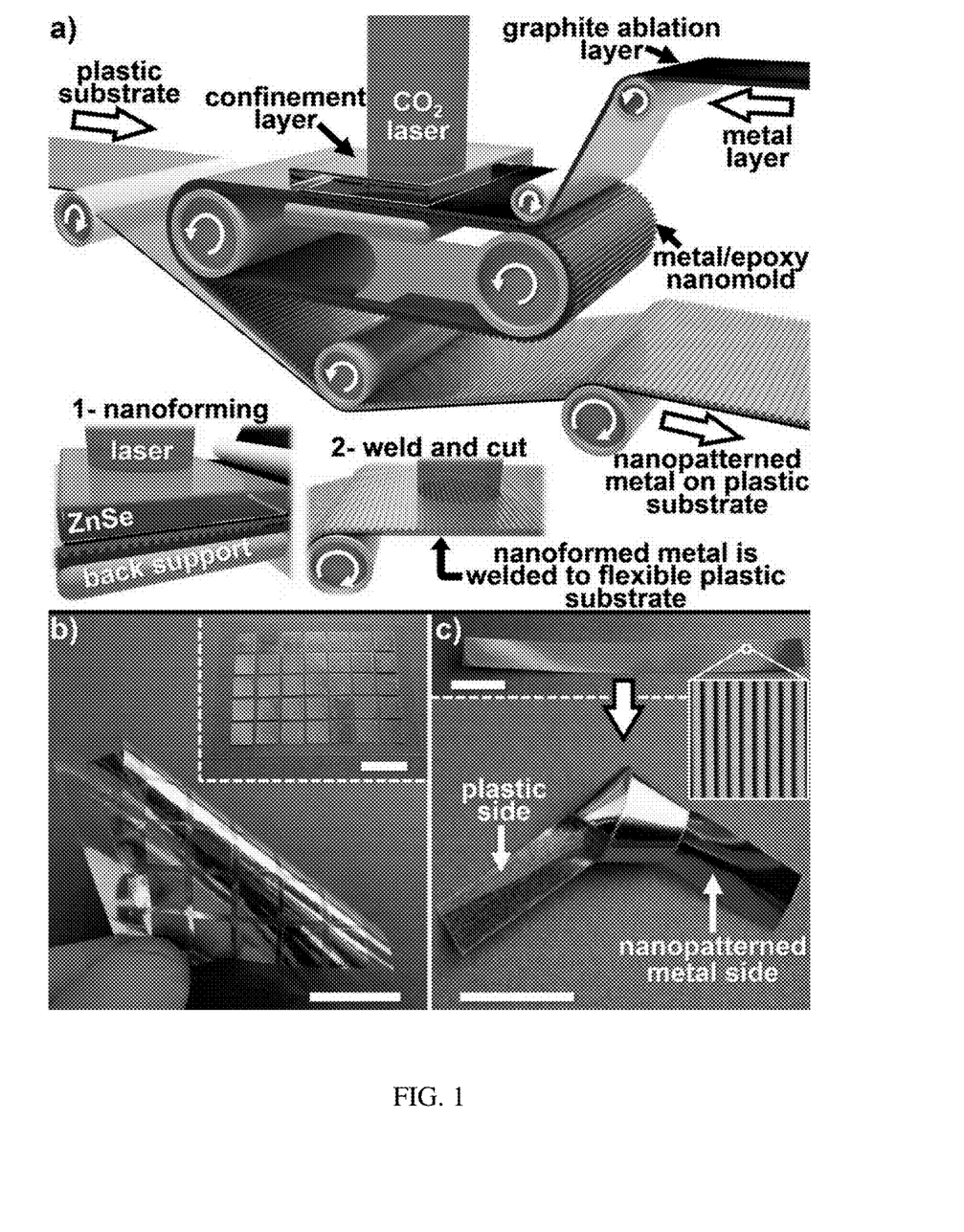
Figure 2:
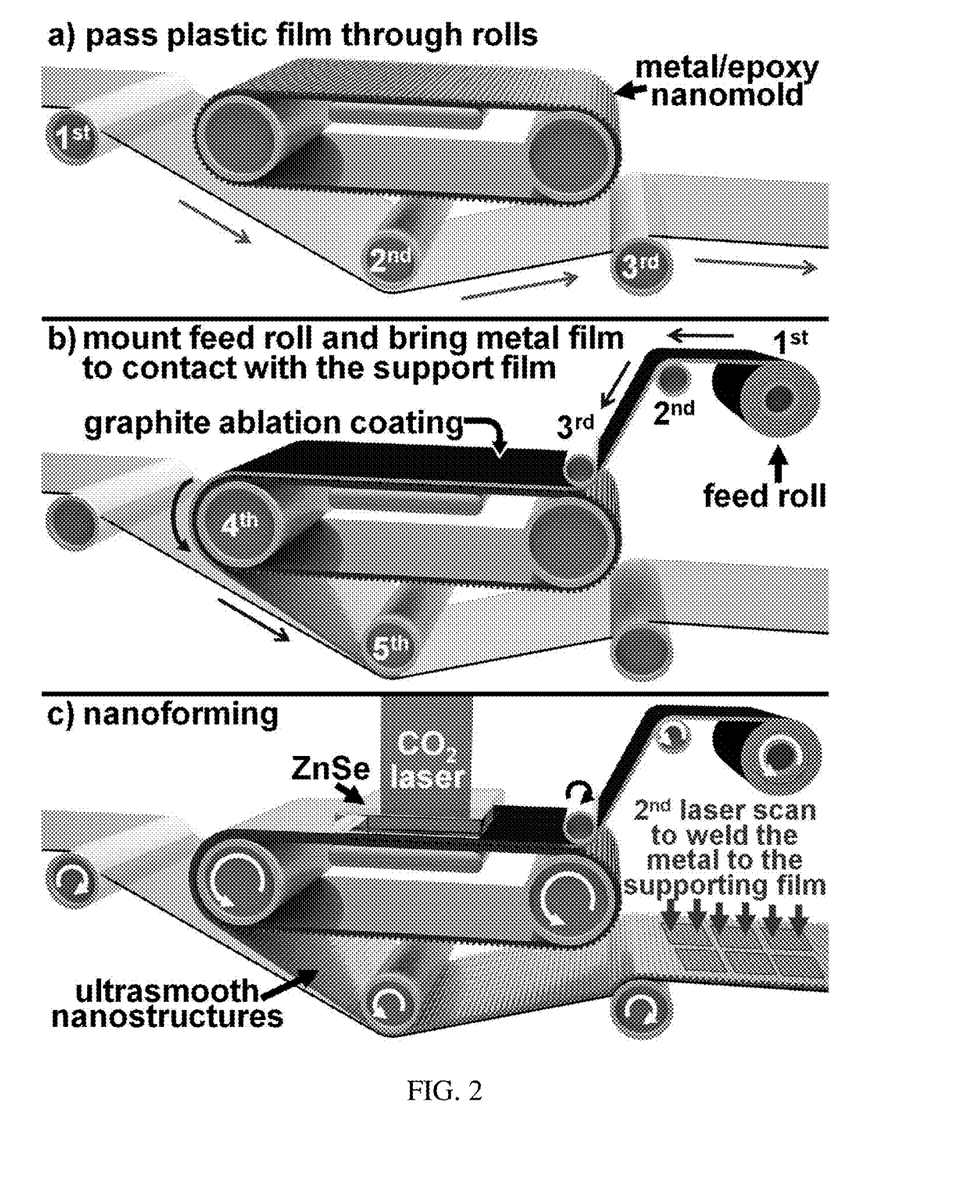
FIG. 2 shows schematic diagram summarizing the steps followed to load the feed roll into the custom-made R2R system. (a) The plastic support is fed from the left and passed through the rolls at the bottom of the R2R system (in the direction of the arrows, according to the order described in the figure). (b) The feed roll is added to the R2R system, placed over the metal/epoxy nanomold and brought into contact with the support film (following the direction of the arrows, in the order described). (c) An IR window (ZnSe) is used as a confinement layer, so that the expansion of the ablated graphite layer induces the superplastic deformation of the metal film into the nanomold upon laser irradiation.
Figure 3:
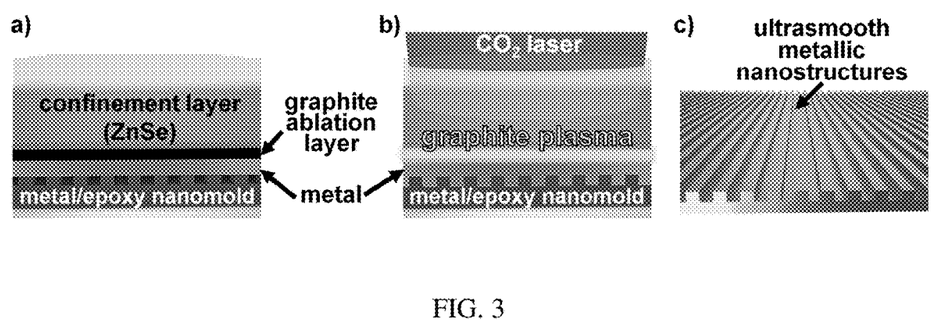
FIG. 3 shows schematic diagram of the nanoforming process in R2RLIS. (a) A free-standing metal film is spraycoated on one side with a ~5-μm-thick layer of graphite and placed on top of an epoxy nanomold metallized with 50 nm of titanium. A ZnSe window is used to confine the shockwave produced by the laser ablation of the graphite layer. (b) A $CO_2$ laser beam locally ablates the graphite, generating a shockwave which induces the superplastic flow of the metal film into the nanomold. (c) Ultrasmooth crystalline metallic nanostructures are obtained after demolding the metal film from the nanomold. No lubricating layer is necessary to perform R2RLIS.

FIG. 1a shows two laser-based fabrication steps in R2RLIS: nanoforming and welding to a flexible substrate. Briefly, during the nanoforming step, a set of rubber rolls introduce a metallic film, coated with graphite on one of its sides, under a confinement layer (more details in FIG. 2). This confinement layer, controlled by a linear actuator, presses the metallic film against a tensioned belt carrying a metal/epoxy nanomold using a metal plate as a back support. A conventional $CO_2$ laser (60 W, $\lambda=10.6$ μm, continuous wave) was used to ablate a ~5-μm-thick graphite layer sprayed on the back of the metallic film (5-8 μm-thick). The shock wave generated by the ablation of the graphite layer and confined by a ZnSe or $CaF_2$ window induces the superplastic flow of the metal into the nanoscale features of the underlying nanomold (FIG. 3). The peak pressure of the shock wave generated by the $CO_2$ laser depends on the power density used to ablate the graphite layer, reaching up to 1.5 GPa (at 5 MW/cm$^2$). The propagation of the shock wave along the metallic film induces superplastic strain rates ($10^6$-$10^7$ s$^{-1}$), facilitating the conforming of the metal to the nanomold. The low absorbance of ZnSe and $CaF_2$ at $\lambda=10.6$ μm prevents the confinement layer from damage by the laser pulses during the R2RLIS process, since the temperature of the graphite plasma is not sufficiently high to dry etch the confinement layer.

After the metal film is patterned with ultrasmooth nanostructures, a set of synchronized rubber rolls transfers it onto a thermo-adhesive plastic substrate (polyethylene terephthalate, PET). The localized heating of the polymer, once the $CO_2$ laser scans the final shape of the device (~1.6 J/mm$^2$), welds the patterned metal to the plastic. FIG. 1b shows that metallic nanostructures welded to a flexible substrate are easy to manipulate and bend (radius of curvature as low as 0.5 mm). The thin nanopatterned Au/PET composites fabricated by R2RLIS exhibit a robust interfacial contact and enough flexibility to be tied into a knot (FIG. 1c).

Since nanomold cost is one of the main limitations of laser shock-based nanofabrication techniques, R2RLIS of the present disclosure was carried out using low-cost metal/ epoxy nanomolds fabricated using soft lithographic tools. See Li, Y.; Ng, H. W.; Gates, B. D.; Menon, C. *Nanotechnology* 2014, 25, 285303. Briefly, silanized fused silica diffraction gratings and silicon nanomolds fabricated by electron beam lithography (EBL) and reactive ion etching (RIE) were used as masters for soft replica molding. Flexible h-PDMS/PDMS stamps were generated from the masters and the nanofeatures of the flexible stamps were transferred to a flexible PET film coated with a low-surface-energy epoxy. After UV-curing the epoxy through the h-PDMS/PDMS stamp, the epoxy replicas of the flexible stamp were metallized with a 50-nm-thick layer of Ti and used as nanomolds for R2RLIS. The h-PDMS/PDMS stamps were used to fabricate epoxy nanomolds for this study more than 200 times with no apparent damage or degradation. The low laser power density used in R2RLIS enables the reusability of these low-cost nanomolds up to 90 times before the mechanical fatigue suffered by Ti/epoxy composite affects the quality of the nanostructures fabricated by R2RLIS. Ti/epoxy nanomolds do not require any lubricant layer to work or to release the metal film after nanoforming.

Selective Nanoforming, Welding, and Cutting

Figure 4:
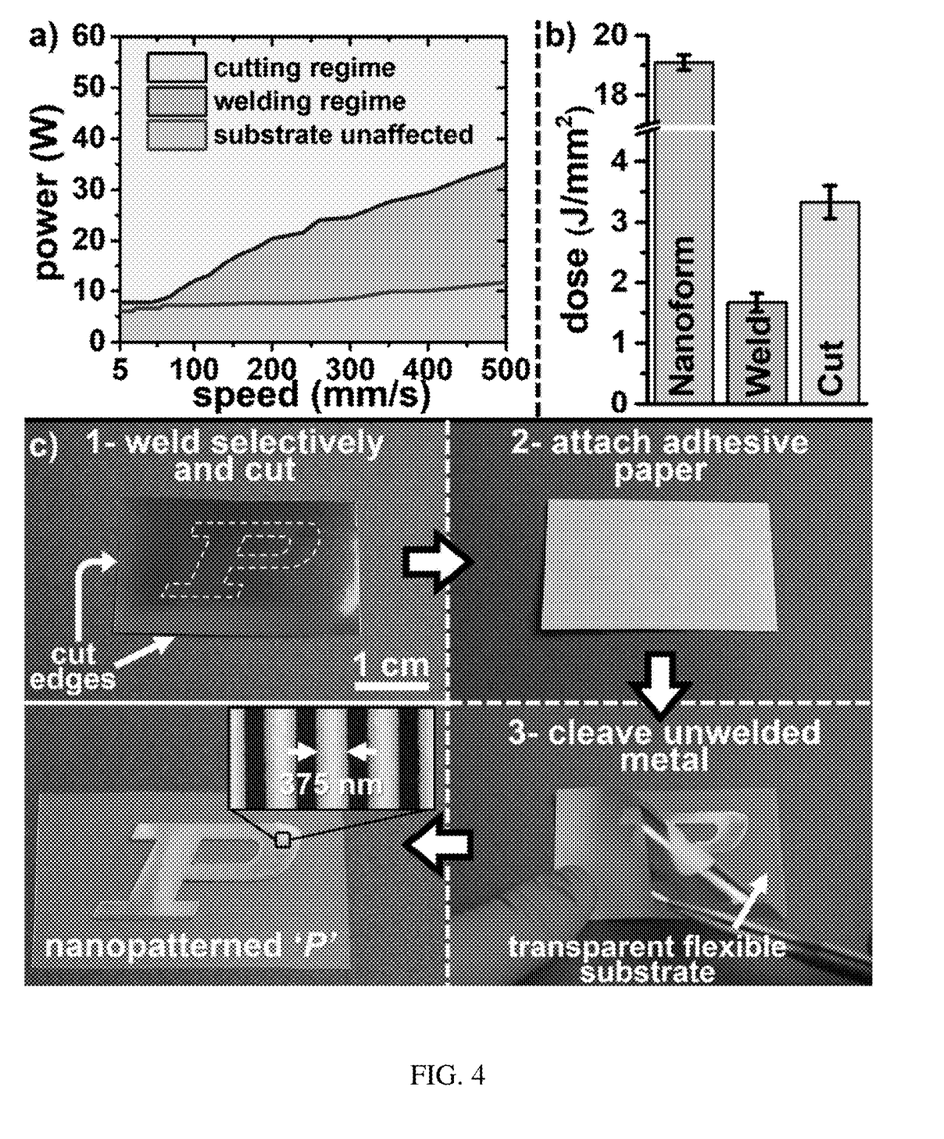
FIG. 4 shows operating regimes of conventional $CO_2$ laser systems for 5-μm-thick Au films. (a) Cutting and welding regimes for Au films not coated with an ablation layer. (b) Typical doses necessary for achieving nanoforming (using an ablation layer), welding, and cutting. (c) Fabrication of flexible plasmonic devices using R2RLIS: 1) After the nanoforming of the metal, the highlighted region of the film (dashed "P") is welded to the flexible PET substrate, and the perimeter of the device is cut; 2) adhesive paper is attached to the Au/PET composite; 3) the removal of the adhesive paper cleaves the unwelded regions of the device, leaving the welded nanoformed region intact. Inset shows a high-resolution AFM image of the ultrasmooth Au nanograting.

R2RLIS makes it possible for conventional $CO_2$ lasers—typically used for cutting and welding—to perform roll-to-roll nanoforming processes, providing them with the functionality of patterning nanostructures on the surface of thin metallic films. FIG. 4a shows the $CO_2$ laser power required to weld or cut 5-μm-thick Au films mounted on a PET substrate for different scanning speeds. It was found that the laser dose necessary to weld and cut these Au/PET composites (not coated with an ablation layer) was 1.67 J/mm$^2$ and 3.33 J/mm$^2$, respectively (FIG. 4b). Pressing the Au film with the confinement layer (~200 mbar), it was found that the dose needed to induce superplastic flow to the film—coated with a ~5-μm-thick graphite ablation layer—during the nanoforming process is 19.1 J/mm$^2$. FIG. 4c shows the process followed to fabricate flexible plasmonic devices using R2RLIS. First, the Au film is nanoformed against a Ti/epoxy nanomold with a 375 nm linewidth and 120 nm height. After nanoforming the desired region of the metal film, consuming most of the graphite ablation coating on that area, the roll-to-roll system mounts the nanopatterned metal on the PET substrate. A second laser scan welds the nanoformed regions of the metal film to the underlying plastic substrate. Right after the welding scan, the $CO_2$ laser trims the final shape of the device according to the powers and scanning speeds described in FIG. 4a. Finally, the robust interfacial contact between the substrate and the welded nanoformed region of the metal film allows for the removal of the unwelded regions of the device using conventional adhesive paper or tape.

Figure 5:
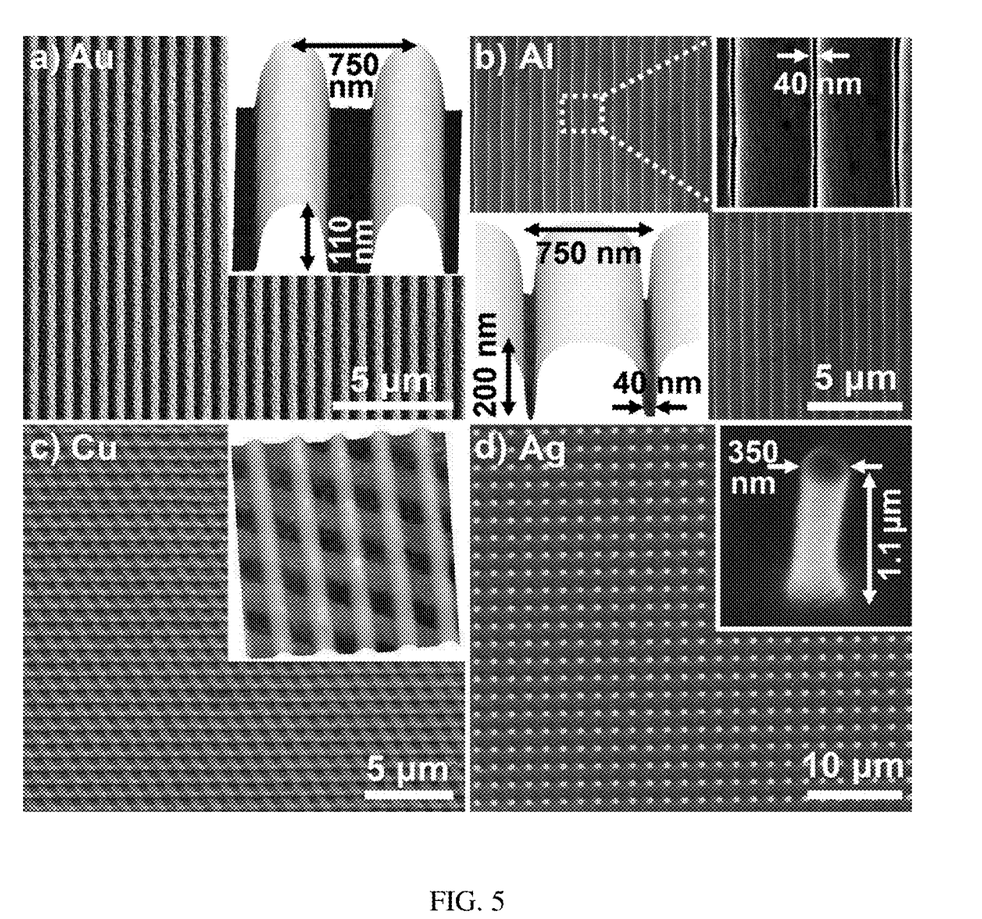
FIG. 5 shows ultrasmooth, 3D nanostructures fabricated by R2RLIS. (a) Au nanograting with a 350 nm linewidth and a 110 nm height. (b) Nano V-grooves with an aspect ratio of 5 (200 nm depth, 40 nm width) fabricated on Al. (c) Nanoscale fishnet fabricated on a Cu film. (d) Array of Ag nanopillars with a diameter of 350 nm and height 1.1 μm. SEM and AFM are used to visualize the nanostructures.

FIG. 5 shows several examples of ultrasmooth metallic nanostructures fabricated by R2RLIS on Au, Al, Cu, and Ag films. FIGS. 5a and 5b show ultrasmooth gratings with square and triangular nanogrooves fabricated in Au and Al films. Nano V-grooves fabricated in Al using R2RLIS reached uniform aspect ratios of 5 (200 nm depth, 40 nm width) over large areas. Similar nanogratings have been demonstrated to support the propagation of channel plasmon polaritons, which makes them attractive for photonic applications. R2RLIS also enables the possibility of creating nanoscale fishnet structures by nanoforming a metal film twice using the same square-groove nanomold (FIG. 5c). Once the nanograting is formed on the surface of the metal film, after the first nanoforming process, the ablation coating is re-applied on the back of the film and a second nanoforming process is performed against the nanomold, perpendicularly oriented with respect to the first nanoforming process. To compensate for the strain hardening of the sample after the first nanoforming step ($CO_2$ laser power density of 2.12 MW/cm$^2$), a higher laser power density is applied (4.05 MW/cm$^2$) to create a uniform nanoscale fishnet (FIG. 5c). Such nanoscale fishnet designs have been proposed as left-handed metamaterials for high resolution focusing and invisibility cloaks. FIG. 5d shows that R2RLIS is also compatible with the fabrication of arrays of discrete 3D nanostructures such as cylindrical Ag nanopillars with ultrasmooth lateral surfaces and a diameter of 350 nm and height 1.1 μm.

Nanoscale Deformation Mechanisms of R2RLIS

Figure 6:
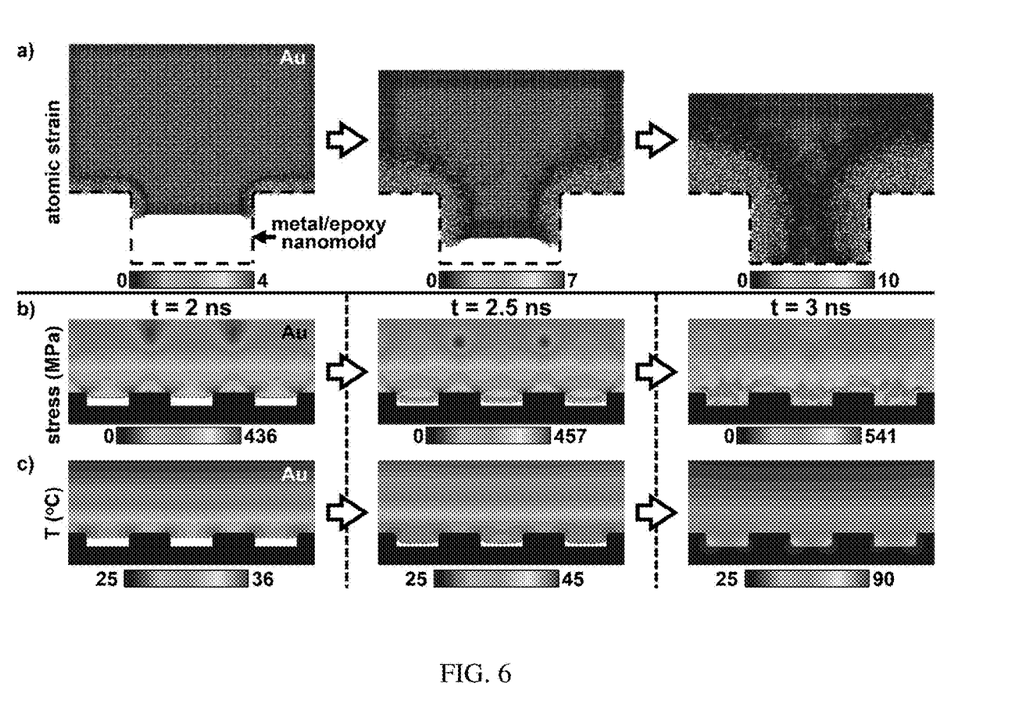
FIG. 6 shows multi-scale simulations describing the mechanisms of R2RLIS. (a) Atomic snapshots from MD simulations showing the evolution of atomic strain distribution as a single-crystal Au slab flows superplastically into the nanomold. The atoms at the edges and corners of the mold experience large strains while a low strain field exists in the interior regions. (b, c) Coupled thermo-mechanical FEM simulations showing the stress distribution and temperature rise in an Au slab during R2RLIS. t=0 is defined as the instant at which the graphite layer ablates, triggering the superplastic flow of the metal. High-strain-rate processes like R2RLIS (the nanoforming time is ~3 ns) are realized by a low-temperature dynamic recrystallization, as predicted by the low temperature rise (<90° C.) in the Au slab.

To understand the underlying mechanism of R2RLIS and to estimate the critical strain rate necessary to activate superplasticity in metals, the nanoforming of Au films were investigated by combining finite element method (FEM) and molecular dynamics (MD) simulations with atomic force microscopy (AFM), see FIG. 6. MD simulations reveal that the strains suffered by the metal during the nanoforming process are much higher on the areas closer to the corners and edges of the nanomold than inside the nanomold due to a nanoscale geometrical confinement effect and a low-temperature dynamic recrystallization (FIG. 6a). The new grain boundaries generated during the nanoforming process efficiently absorb dislocations, prevent dislocation avalanches and strain bursts, and enable the reduction of the grain sizes, providing uniformity to the nanoforming process and enabling the fabrication of nanostructures with ultrasmooth surfaces. According to FEM simulations (FIG. 6a, 6c), this high-strain-rate deformation process induces a low temperature rise on the nanomold (<90° C.), which is efficiently dissipated by the Ti/epoxy composite, preserving the structural integrity of the nanomold after the nanoforming process. The generation of complex stresses (FIG. 6b) facilitates the nucleation of subgrains and grains, reducing the grain size. It was experimentally found that laser power densities lower than 1.45 MW/cm$^2$ were not able to generate enough pressure to activate superplasticity in 5-μm-thick Au films. This critical nanoforming laser intensity depends on the mechanical properties of the metallic film, its thickness, the efficiency of the confinement layer, and the thickness of the graphite ablation layer.

Figure 7:
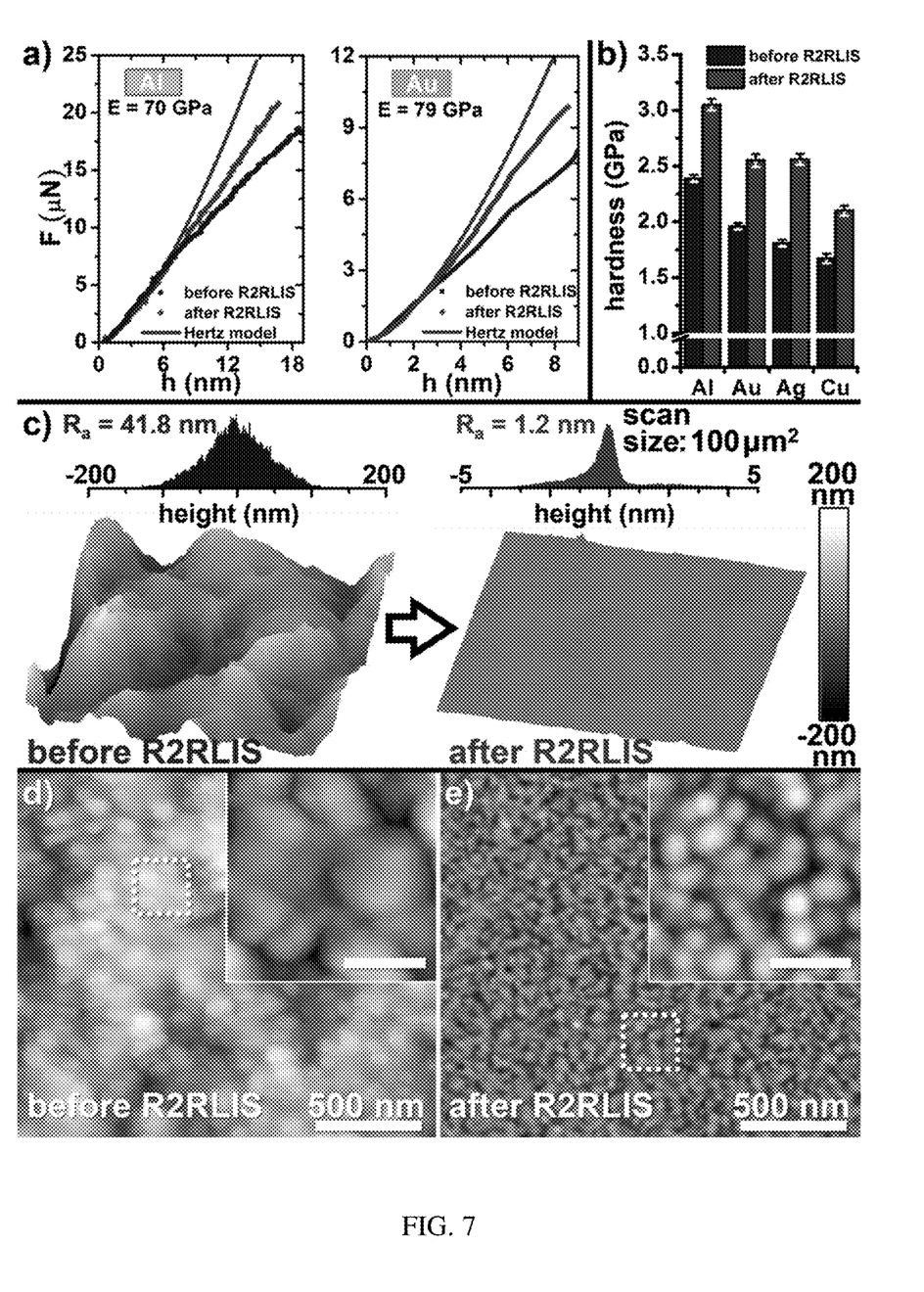

Tunability of the Mechanical and Optical Properties of the Fabricated Nanostructures FIG. 7 shows the increase of the hardness of several metal films processed by R2RLIS using a flat silicon wafer as a mold. AFM nanoindentation was used to characterize the strength of the metal films before and after R2RLIS. The hardness of as-received Au films is ~1.96 GPa, whereas the hardness of the film after R2RLIS is ~2.55 GPa (30% increase, see FIG. 7a). Similarly, increments were achieved in the strength of Ag, Al, and Cu of 41.4%, 27.6%, and 25.8%, respectively (FIG. 7b). Additionally, the superplastic deformation of the metal film against a flat mold reduces the surface roughness of the metal significantly (from 41.8 nm to 1.2 nm in the case of 5-μm-thick Au films, see FIG. 7c). FIGS. 7d and 7e show that the improved strength and ultrasmooth surfaces of the fabricated nanostructures are due to the grain/subgrain refinement achieved during the nanoforming process, as predicted by MD simulations (FIG. 6a). This increase in hardness of polycrystalline metallic films caused by grain size refinement is consistent with the Hall-Petch relation, hardness∝(grain size)$^{-1/2}$. Using high-resolution AFM, we found that R2RLIS decreases the grain sizes of an Au film from 117±23 nm to 31±4 nm, applying a laser power density of 4.77 MW/cm$^2$. Since all grain sizes measured after R2RLIS were >10 nm, small grain softening can be neglected. It was found that the laser power density irradiated over the ablation layer correlates with the grain boundary disorder imparted to the metal, increasing its hardness and reducing its surface roughness.

Figure 8:
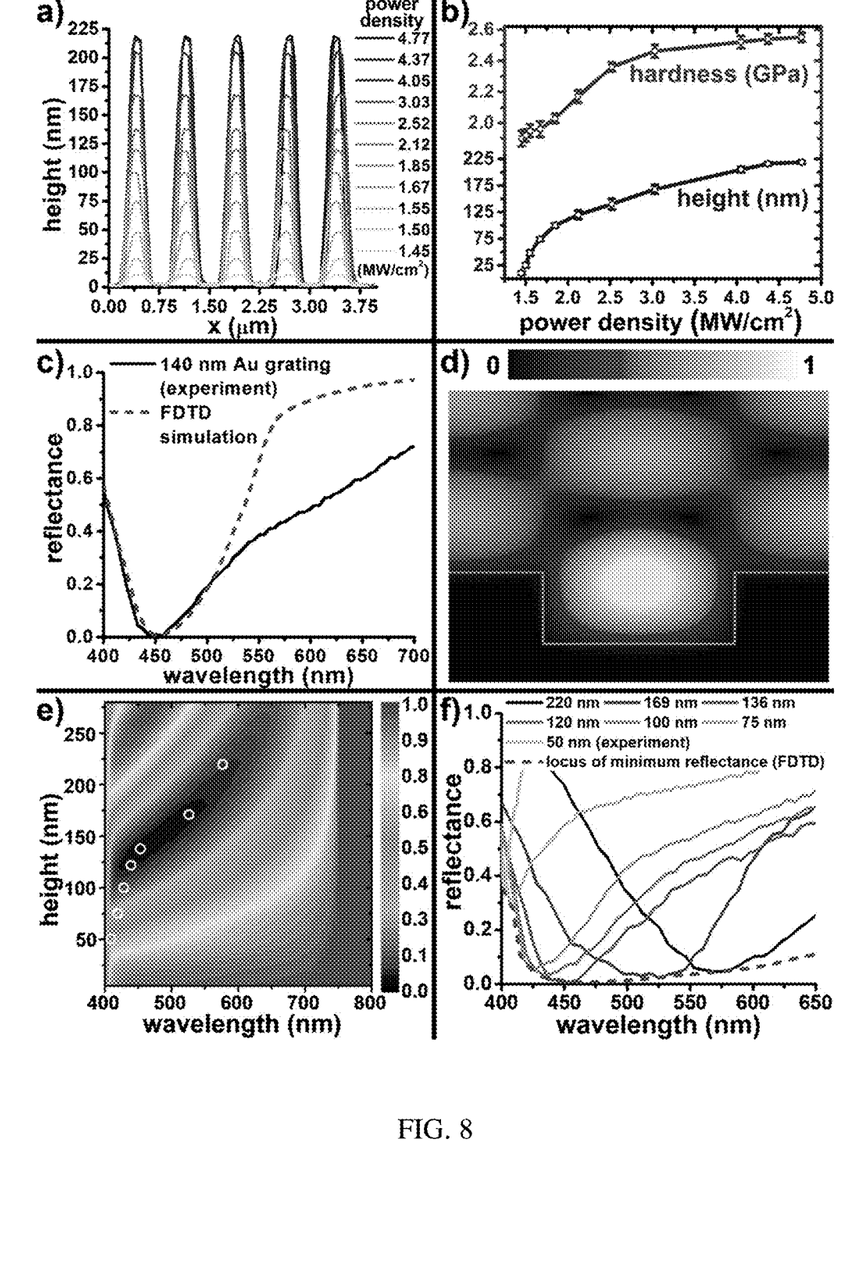

To demonstrate the nanomanufacturing of large-area arrays of plasmonic nanostructures active in the optical range using R2RLIS, eleven Au nanogratings with different aspect ratios were fabricated (FIG. 8a). Au was chose as the plasmonic material is due to its low ohmic loss at optical frequencies and its high oxidation resistance. All Au nanogratings were fabricated using the same Ti/epoxy nanomold (350 nm width, 220 nm depth); however, by applying different laser power densities during the nanoforming process. Nanostructures with different aspect ratios and hardness values were obtained (FIG. 8b). The capability of tuning the aspect ratio of the fabricated nanostructures by controlling the laser power used in R2RLIS enables the customization of the optical reflection of the resulting flexible plasmonic device from near-perfect reflection (Au flat surfaces planarized by R2RLIS) to near-zero reflection at $\lambda$=450 nm (Au nanogratings 350 nm width and 140 nm height), see FIG. 8c. Slight differences in the shape between the experimental resonance peaks and the finite-difference time-domain (FDTD) simulations are likely due to the losses in the experimental system. It was found from further simulations that the reflection-dip red-shifts as the height of nanograting increases (FIG. 8e). To verify this point, seven representative samples were fabricated featuring nanogratings with heights of 50, 75, 100, 120, 136, 169, and 220 nm, as indicated by the white circles in FIG. 8e. The closeness of the minimum reflection values—measured experimentally using a UV-Vis-NIR spectrophotometer—to the FDTD model predictions, demonstrates that R2RLIS can be used for the large-scale production of ultrasmooth plasmonic nanostructures of sufficient quality for optical applications (FIG. 8f).

In summary, R2RLIS enables the rapid and inexpensive fabrication of ultrasmooth metallic nanostructures over large areas using conventional $CO_2$ engravers. Using low-cost metal/epoxy nanomolds, the minimum feature size obtained by R2RLIS was 40 nm, facilitating the rapid fabrication of flexible near-perfect absorbers at visible frequencies with the capability to wrap around non-planar surfaces. R2RLIS has five significant advantages over other roll-to-roll nanomanufacturing processes: (i) It generates ultrasmooth metallic nanostructures using laser-induced superplasticity, overcoming coarse grain limitations on nanoforming; (ii) it can be performed at ambient conditions using conventional $CO_2$ engravers; (iii) it is scalable and inexpensive, using low-cost nanomolds easily fabricated by replica molding; (iv) it can attach the nanopatterned metallic films to flexible polymeric substrates with sufficient interfacial strength for practical applications; and (v) tuning the laser intensity applied in the nanoforming process, enables the control of the final hardness and aspect ratio of the fabricated nanostructures. R2RLIS, with the appropriate design of the nanomolds and configuration of the laser, could be extended to the cost-effective scalable fabrication of crystalline nanostructures for the development of future electronic, biosensing, and optical devices.

Those skilled in the art will recognize that numerous modifications can be made to the specific implementations described above. The implementations should not be limited to the particular limitations described. Other implementations may be possible.

We claim:

1. A continuous laser nanoforming device, comprising:
a nanomold configured to continuously receive and transport a metallic film, wherein the metallic film includes a metal layer and an ablative layer;
a laser generator configured to generate a laser beam to hit the ablative layer of the metallic film to generate a shockwave and thereby create a nanoformed metal from the metallic film as the metallic film moves relative to the laser generator; and
a confinement layer configured to confine the shockwave during continuous motion of the metallic film relative to the confinement layer and the laser generator, wherein the confinement layer is configured to contact the ablative layer to press the metallic film against the nanomold while the metallic film moves relative to the confinement layer and the laser generator such that the confinement layer is disposed between the laser generator and the metallic film, and the laser beam is transferred through the confinement layer toward the ablative layer of the metallic film.

2. The continuous laser nanoforming device of claim 1, wherein the laser generator is a carbon dioxide (CO2) laser, a continuous laser, a pulsed laser, or a fiber laser operating in the visible or infrared spectrum.

3. The continuous laser nanoforming device of claim 1, wherein the laser generator is a carbon dioxide (CO2) laser generator.

4. The continuous laser nanoforming device of claim 1, wherein the confinement layer includes silicate glass, soda-lime glass, CaF2, ZnSe, or any other solid or liquid media transparent at wavelength of emission defined by the laser beam.

5. The continuous laser nanoforming device of claim 1, further including a rotary film feeder configured to transfer the metallic film to the nanomold.

6. The continuous laser nanoforming device of claim 1, further including a roll-to-roll system to transfer the nanoformed metal to a rigid, flexible, or stretchable substrate.

7. The continuous laser nanoforming device of claim 1, further including a roll-to-roll system to adhere the nanoformed metal to a rigid, flexible, or stretchable substrate.

8. The continuous laser nanoforming device of claim 1, wherein the nanomold is a thin nanopatterned metal, polymer, ceramic, glass, or any combination thereof.

9. The continuous laser nanoforming device of claim 1, wherein the nanomold is a metal-coated polymeric nanomold.

10. The continuous laser nanoforming device of claim 1, wherein the nanomold is a titanium-coated epoxy-based nanomold.

11. The continuous laser nanoforming device of claim 1, wherein the nanomold is coupled with one or more rollers, wherein the nanomold is configured to maintain continuous contact with the metallic film.

12. The continuous laser nanoforming device of claim 5, wherein the rotary film feeder includes one or a plurality of rollers.

13. The continuous laser nanoforming device of claim 1, wherein the ablative layer includes graphite.

14. The continuous laser nanoforming device of claim 1, further comprising a back support positioned adjacent to the confinement layer, wherein the nanomold and metallic film are configured to translate between the confinement layer and the back support, wherein the confinement layer is configured to press the metallic film and the nanomold against the back support as the metallic film and nanomold translate relative to the confinement layer and the back support.

15. The continuous laser nanoforming device of claim 1, wherein the confinement layer is movable relative to the metallic layer via linear actuation.

16. A laser nanoforming device, comprising:
a nanomold configured to continuously receive and transport a multilayer film, wherein the multilayer film includes a metal layer and an ablative layer;
a first laser generator configured to direct a first laser beam onto the ablative layer of the multilayer film as the multilayer film moves relative to the first laser generator to produce a nanoformed material when the first laser beam generates a shockwave at a surface of the multilayer film;
a confinement material disposed between the first laser generator and the multilayer film, wherein the confinement material is configured to press the multilayer film against the nanomold while the first laser beam is transferred through the confinement material toward the ablative layer such that the confinement material is configured to confine at least a portion of the shockwave during continuous motion of the multilayer film relative to the confinement material and the first laser generator;
a rotary film feeder configured to join the nanoformed material with a substrate material; and
a second laser generator configured to weld the nanoformed material to the substrate material.

17. A laser nanoforming device, comprising:
a rotary nanomold configured to continuously receive and transport a multilayer film, wherein the multilayer film includes a metal layer and an ablative layer;
a laser generator configured to direct a laser beam onto the ablative layer of the multilayer film as the multilayer film moves relative to the laser generator to generate a shockwave and thereby produce a nanoformed material;
a transparent confinement material disposed between the laser generator and the multilayer film, wherein the transparent confinement material is configured to transfer the laser beam therethrough toward the ablative layer during continuous motion of the multilayer film relative to the transparent confinement material and the laser generator; and
a back support positioned adjacent to the transparent confinement material;
wherein the rotary nanomold and multilayer film are configured to translate between the transparent confinement material and the back support, and
wherein the transparent confinement material is configured to press the multilayer film and the rotary nanomold against the back support as the layer multilayer film and rotary nanomold translate relative to the transparent confinement material and the back support.

18. The laser nanoforming device of claim 17, wherein the transparent confinement material includes silicate glass, soda-lime glass, CaF2, ZnSe.

19. The laser nanoforming device of claim 17, further including a rotary film feeder configured to transfer the multilayer film to the rotary nanomold.

20. The laser nanoforming device of claim 17, wherein the ablative layer includes graphite.

* * * * *